Nov. 18, 1969 M. J. GRIMES ET AL 3,478,420

METHOD OF PROVIDING CONTACT LEADS FOR SEMICONDUCTORS

Filed Dec. 31, 1968 2 Sheets-Sheet 1

Inventors:
MILTON J. GRIMES,
DONALD F. HENRIKSON &
HERBERT R. MEISEL
M. Y. Epstein
Attorney

METHOD OF PROVIDING CONTACT LEADS FOR SEMICONDUCTORS

Filed Dec. 31, 1968 2 Sheets-Sheet 2

Inventors:
MILTON J. GRIMES,
DONALD F. HENRIKSON &
HERBERT R. MEISEL
M. Y. Epstein
Attorney United States Patent Office 3,478,420

Patented Nov. 18, 1969

3,478,420

METHOD OF PROVIDING CONTACT LEADS FOR SEMICONDUCTORS

Milton J. Grimes, Flemington, Donald F. Henrikson, Somerset, and Herbert R. Meisel, Springfield, N.J., assignors to RCA Corporation, a corporation of Delaware Continuation-in-part of application Ser. No. 554,564, June 1, 1966. This application Dec. 31, 1968, Ser. No. 795,388

Int. Cl. B01j *17/00;* H01l *1/10*

U.S. Cl. 29—588 9 Claims

ABSTRACT OF THE DISCLOSURE

A substrate is provided onto which a semiconductor pellet is mounted. A terminal means having an extending contact is engaged with the substrate with the free end of the contact engaged with a preselected spot on the pellet. The relative positioning of the contact, pellet, and substrate are fixed, by encapsulating a portion of the substrate, the pellet, and a portion of the contact in a solidifying encapsulating material. The contact is then separated from the terminal means leaving the contact extending outwardly from the encapsulating material to serve as a lead for the device.

This is a continuation-in-part of copending application Ser. No. 554,564 filed June 1, 1966.

BACKGROUND OF THE INVENTION

This invention relates to the fabrication of semiconductor devices.

In the fabrication of certain types of semiconductor devices, e.g., power transistors, a semiconductor pellet is mounted on a substrate, and terminal members or leads are engaged with the pellet and substrate. Some difficulty exists, or at least there is room for improvement, with respect to one or more of the various operations of positioning the pellet on the substrate, disposing the lead members in proper relation with the pellet and/or substrate, and bonding the various members together.

SUMMARY OF THE INVENTION

A method is provided comprising positioning a semiconductor pellet on a substrate, engaging a contact member of a terminal means with the pellet and securing the terminal means to the substrate to maintain the contact member pressed against the pellet, bonding the contact member to the pellet, and severing the contact member from the terminal means to provide an extending lead for the pellet.

DESCRIPTION OF PREFERRED EMBODIMENTS OF THE INVENTION

Figure 1:
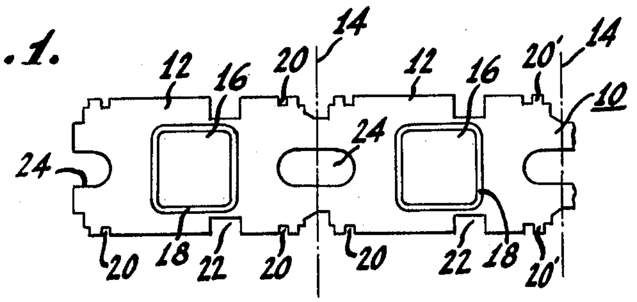
FIGURE 1 is a plan view of a workpiece carrier.

With reference to FIGURE 1, an elongated, strip-like carrier 10 is shown comprising a plurality (only two of which are shown) of identical connected substrates 12. A dashed line 14 indicates the boundary between adjacent substrates. Each substrate 12 comprises a workpiece onto which a semiconductor device is to be assembled. The carrier 10 may be fabricated by known processes, such as stamping and coining.

Each substrate 12 comprises a square area 16 defined by a dovetailed groove 18 (see FIGURE 8), four clip locking slots 20, two terminal insulating slots 22, and two mounting slots 24. By "dovetailed" is meant a groove wherein one or both walls, or portions thereof, converge upwardly from the bottom of the groove. The purpose of these substrate portions appears hereinafter. In this embodiment, the device is a power output semiconductor, and the substrate 12 serves as a heat sink. To this end, the substrate 12 is made from a high thermal conductivity material, such as nickel plated copper, having a thickness of 60 mils.

Figure 2:
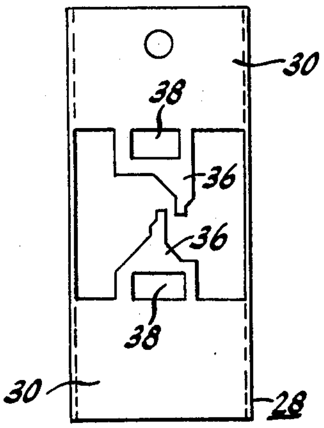
FIGURE 2 is a plan view of a terminal means.
Figure 3:
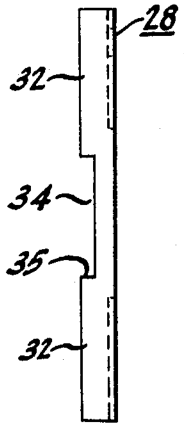
FIGURE 3 is a side elevation of the terminal means shown in FIGURE 2.
Figure 4:
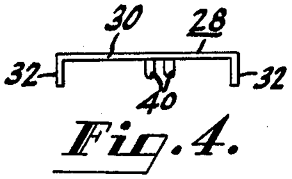
FIGURE 4 is a front elevation of the terminal means shown in FIGURE 2.

With reference to FIGURES 2, 3, and 4, a terminal means or clip 28 is shown which is to be assembled one each onto each substrate 12. The clip 28 has a generally U-shaped or channel iron shape including a pair of spaced cross straps 30 joined by dependent sides 32 each having a cutout 34. Two contact members 36 extend towards one another from the cross straps 30. Each contact member 36 includes a rectangular opening 38, and terminates in a downwardly extending tip 40. The purpose of these clip portions appears hereinafter.

The clip 28 may be formed from sheet metal by known stamping and forming processes. The clip is made from an electrically conductive, readily bonded material, such as nickel strip of 10 mils thickness.

In the assembly of a semiconductor device on each substrate 12 of the carrier 10, identical operations are performed either successively or simultaneously on each substrate. Apparatus for performing these operations, including apparatus for indexing the carrier to and accurately positioning the substrates at each operating station, are described either only generally or not at all since the provision of suitable apparatus for performing these functions is well within the ability of persons skilled in the arts.

Figure 5:
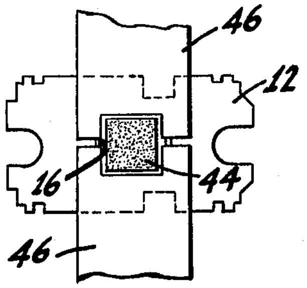
FIGURE 5 is a plan view showing a first step in the assembly of a semiconductor device.

In a first assembling operation, a semiconductor pellet 44, as shown in FIGURE 5, is placed and held on the area 16 of the substrate 12. Placing and holding means comprising a pair of oppositely acting combing members 46, of known type, can be used, for example, to hold the pellet 44 in precise relationship with the substrate 12. Although not shown, means can be utilized for automatically feeding the pellets 44 from a magazine onto the substrate 12.

The semiconductor pellet 44 used depends upon the type of semiconductor device being assembled, and may be of a known type used in transistors, integrated circuits, or the like. In this embodiment, the device is an NPN transistor using a pellet 44 of silicon. Details of the pellet 44 are not shown, since such pellets are well known. The pellet 44 is provided with bonding pads, of known type, to which contacts or leads of the semiconductor device are to be attached. In this embodiment, the bonding pads comprise a thin layer of a solder material such as lead. The bottom surface of the pellet, which, in this embodiment, is electrically connected to an electrode of the pellet, is likewise coated with lead.

Figure 6:
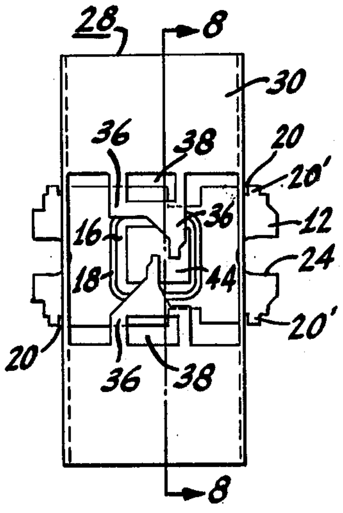
FIGURE 6 is a plan view showing a later step in the assembly process.
Figure 8:
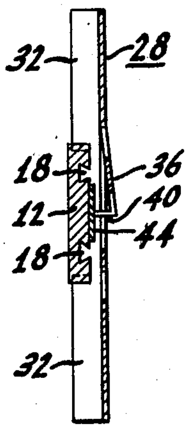
FIGURE 8 is a sectional view along line 8—8 of FIGURE 6.
Figure 7:
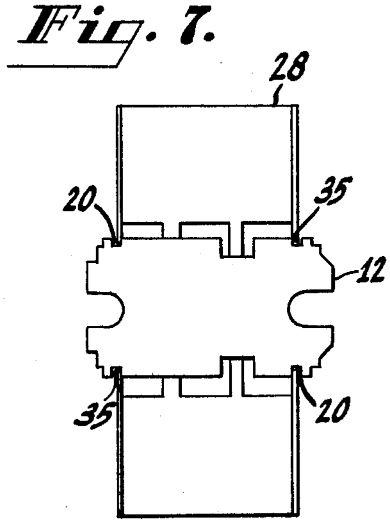
FIGURE 7 is a bottom view of the parts shown in FIGURE 6.

While the pellet 44 and the substrate 12 are held in fixed relation with respect to one another, a clip 28 is mounted onto the substrate. To accomplish this, the clip 28 is disposed across the substrate 12, as shown in FIGURES 6 and 7, with the inner ends 35 of the walls 32 extending into the clip locking slots 20. Means, not shown, are utilized to accurately position the clip 28 with respect to the substrate 12 and the pellet 44 thereon, and to force the clip downwardly against the substrate 12, whereby the contact tips 40 are engaged with their respective pellet bonding pads (FIGURE 8). The relative dimensions of the assembly parts are so selected that as the clip 28 is forced downwardly against the substrate 12, the contact tips 40 are firmly pressed against the pellet bonding and the contract members 36 are upwardly flexed. The flexed contact members 36 thus serve as tensioned holding the pellet 44 firmly clamped against the substrate 12. While the assembly is so held in pressed relationship, the clip 28 is locked to the substrate 12. This is accomplished by inwardly swaging or crimping over the outer slot walls 20′ (FIGURE 9) of the clip locking slots 20 to firmly lock or clamp the clip sides 32 between the walls of the slots 20. Suitable swaging devices are well known. A relatively rigid workpiece assembly is thus producted.

While, in the embodiment described, the pellet 44 is held in place by the flexed contact members 36, in another embodiment, the pellet is bonded to the substrate, as by soldering, prior to the mounting of the clip 28 onto the substrate.

The assembly is then heated to melt the solder on both sides of the pellet 44 to fusion bond or solder the pellet 44 to the substrate 12, and to solder the contact tips 40 to the pellet bonding pads.

Figure 9:
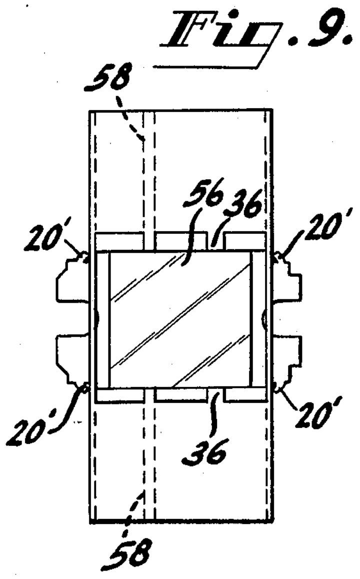
FIGURE 9 is a plan view showing a still later step in the assembly process.
Figures 10, 11, 12, 13:
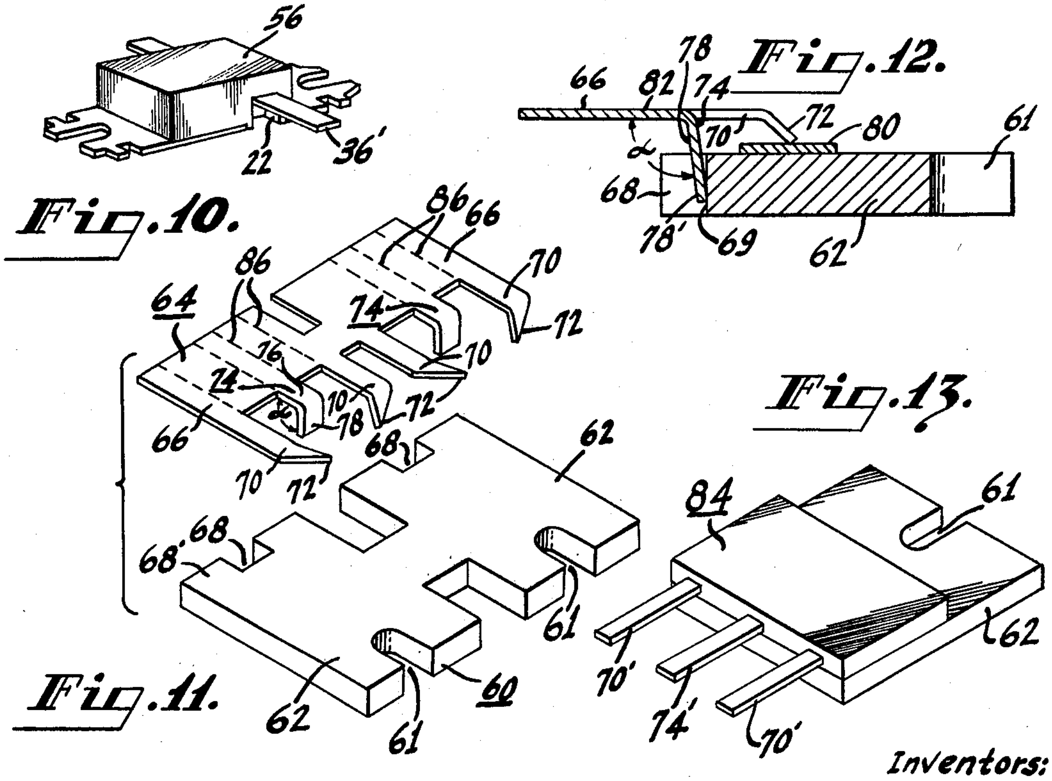
FIGURE 10 is a view in perspective showing a completed device.
FIGURE 11 is a view in perspective showing a modification of a workpiece carrier and a terminal means carrier.
FIGURE 12 is a sectional view showing the first step in the assembly of a device from the parts shown in FIGURE 11.
FIGURE 13 is a view in perspective showing a completed device made from the parts shown in FIGURE 11.

An encapsulating material 56, such as Dow Corning Compjany 306 silicone, is then molded onto the assembly, as shown in FIGURE 9. Means for applying the encapsulating material are known, hence are not shown. The rectangular openings 38 (FIGURE 6) in the contact members 36 facilitate passage of the encapsulating material into the region adjacent to the pellet 44. As shown, the encapsulating material 56 completely encapsulates the pellet 44 and substantially all of each contact member 36. The encapsulating material 56 also lines the walls of the terminal insulating slots 22 (FIGURE 10). Upon hardening, the encapsulating material 56 forms a solid enclosure rigidly fixing the relative positioning of the substrate 12, the pellet 44, and the contact members 36.

The encapsulating material 56 also enters into the dovetail groove 18 (FIGURE 8) thereby firmly anchoring the encapsulating material, when hardened, within the groove, hence to the substrate 12. Other means, such as ridges extending outwardly from the sides of the substrate, which are encapsulated by the encapsulation material, can also be used to anchor the encapsulating material to the substrate. This provides the finished device with great mechanical strength.

To complete the device, the workpiece assembly is separated from the carrier 10 by cutting through the carrier along the dashed lines 14 shown in FIGURE 1. The unencapsulated portions of the clip 28 are also removed, as by cutting through the slot walls 20′ to release the clip. In this embodiment, two elongated device contacts or terminal leads 36′ are provided by cutting the clip straps 30 along the dashed lines 58 shown in FIGURE 9.

While portions of the clip 30 are discarded, the expense is small owing to the small amount of metal in the relatively thin clip. Substantially none of the material of the relatively thick and more expensive substrate is discarded.

The completed device is shown in FIGURE 10 with the two leads 36′ extending horizontally away from the device. Although not shown, the leads 36′ can be bent to extend in any direction, including a downward direction through the terminal slots 22. Shorting of the leads 36′ against the substrate 12 is prevented by the presence of the encapsulaing material lining the slot 22 walls.

In this embodiment, a third terminal of the device is the substrate 12 to which the pellet is directly bonded. In another embodiment, not shown, the semiconductor pellet is insulated from the substrate 12 by means of an intermediate ceramic plate bonded to the substrate and to the pellet by known means. In such case, a clip having three contact members is used. Preferably, a high thermal conductivity ceramic such as beryillia is used.

Likewise, for semiconductor devices such as integrated circuits having larger numbers of terminal leads, clips having the required number of leads can be used.

In use, the completed device is mounted on a chassis by means of screws, or the like, extending through the mounting slots 24. The substrate 12 directly engages the chassis, not shown, whereby excellent heat sinking of the device can be obtained.

In another embodiment, a strip 60 (FIGURE 11) of a plurality of connected substrates 62, and a strip 64 of a plurality of connected terminal means or clips 66 are provided, only two substrates and two clips being shown. Each substrate 62 includes a clip locking slot 68. Each clip 66 is provided with a pair of extending contacts 70 having dependent, converging tips 72 on the ends thereof, and a locking contact 74. The locking contact 74 is L-shaped with the angle $\alpha$ between the two legs 76 and 78 thereof being greater than 90°. In this embodiment, the angle $\alpha$ is 95°.

In the assembly of semiconductor devices from the substrates 62 and clips 66, each clip 66 of the clip strip 64 is simultaneously engaged and locked to a respective substrate 62 of the substrate strip 60. For convenience, the assembly of a single device is illustrated.

As shown in FIGURE 12, a clip 66 is mounted on a substrate 62 having a pellet 80 thereon by inserting the clip locking contact 74 into the slot 68. The dependent tips 72 of the contacts engage preselected portions of the pellet 80, with the flat portion 82 of the clip 66 spaced above the substrate 62. Because of the angle $\alpha$ between the legs 76 and 78 of the contact 74, only the leading tip 78′ of the leg 78 engages the substrate 62. At this time, the pellet 80 is being held by combing means, not shown, in preselected position on the substrate.

The clip 66 is then locked to the substrate 62 by swaging or crimping over the slot 68 walls 68′ against the contact 74. The swaging pressure forces the leg 78 of the contact 74 into full surface contact with the slot wall 69, whereby the clip 66 is tilted or pivoted in a clockwise direction, as viewed in FIGURE 12. The tilting of the clip 66 serves to press the dependent tips 72 downwardly against the pellet 80 firmly clamping the pellet in place between the tips 72 and the substrate 62.

Again, as previously noted, the pellet 80 can be bonded to the substrate 62 prior to the mounting of the clip 66 thereon.

The assembly is then heated to melt soldering material previously provided on the pellet 80 and the clip 66 to fusion bond or solder the pellet to the substrate, and to solder the contacts 70 and 74 to the pellet 80 and the substrate 62, respectively. The pellet 80 and the contacts 70 and 74 are then encapsulated in a suitable encapsulating material 84 (FIGURE 13). The clip 66 is then cut along the dashed lines 86 (FIGURE 11) to provide three leads 70′ and 74′ for the device. The leads 70′ are electrically connected to the pellet 80, and the lead 74′ is electrically connected to the substrate 62.

Devices made as described herein are inexpensive and simple to make, and are extremely rugged and reliable. Also, as will be apparent to those skilled in the art, the herein described processes are readily adaptable to mechanization, whereby large numbers of devices can be quickly and inexpensively fabricated by automated processes.

What is claimed is:

1. A method of fabricating semiconductor devices comprising:
positioning a semiconductor pellet on a substrate in preselected relation therewith;
engaging a contact member of a terminal means with said pellet and securing said terminal means to said substrate for maintaining said contact member firmly pressed against said pellet;
bonding said contact member to said pellet; and
disengaging portions of said terminal means from said substrate leaving said contact member engaged with and extending outwardly from said pellet as a lead therefor.

2. A method of fabricating semiconductor devices as in claim 1 wherein said pellet is first positioned on said substrate without being secured thereto, and said terminal means is thereafter secured to said substrate for clamping said pellet firmly in place between said contact member and said substrate.

3. A method of fabricating semiconductor devices comprising:
positioning a semiconductor pellet on a substrate;
engaging a contact member of a terminal means with said pellet and securing said terminal means to said substrate for maintaining said contact member pressed against said pellet;
bonding said contact member to said pellet; and
severing said contact member from said terminal means to provide an extending lead for said pellet.

4. A method of fabricating semiconductor devices as in claim 3 wherein said pellet is first positioned on said substrate without being secured thereto, and said terminal means is thereafter secured to said substrate for clamping said pellet firmly in place between said contact member and said substrate.

5. A method of fabricating semiconductor devices as in claim 1 or 3 including the step of encapsulating said pellet, portions of said substrate, and portions of said contact member in a solidifying encapsulating material.

6. A method of fabricating semiconductor devices comprising:
positioning a semiconductor pellet on a substrate in preselected relation therewith;

locking a terminal means onto said substrate with an extending contact member of said terminal means firmly pressed against a preselected portion of said pellet thereby clamping said pellet against said substrate;
encapsulating said pellet, portions of said substrate, and portions of said contact member in a solidifying encapsulating material; and
removing portions of said terminal means leaving a lead extending outwardly from said encapsulating material.

7. A method of fabricating semiconductor devices as in claim 1, 2, 3, 4, or 6, including the step of disposing a portion of said terminal means in a slot in said substrate and crimping over a wall of said slot onto said terminal means portion for locking said terminal means to said substrate.

8. A method of fabricating semiconductor devices as in claim 1, 2, 3, 4, or 6, including the step of fusion bonding said contact member to said pellet and fusion bonding said pellet to said substrate.

9. A method of fabricating semiconductor devices as in claim 1, 2, 3, 4, or 6 including the step of severing said terminal means from said substrate and severing portions of said terminal means adjacent to said contact member leaving an elongated lead extending outwardly from said encapsulating material.

References Cited

UNITED STATES PATENTS

| | | | |
|---|---|---|---|
| 2,897,419 | 7/1959 | Howland et al. | 29—589 |
| 3,030,557 | 4/1962 | Dermit | 317—234 |
| 3,066,249 | 11/1962 | Wood | 317—235 |
| 3,076,253 | 2/1963 | Cornelison et al. | 29—589 X |
| 3,080,640 | 3/1963 | Jochems | 29—589 X |
| 3,264,712 | 8/1966 | Hayashi et al. | 29—589 X |
| 3,264,715 | 8/1966 | Siebertz | 29—591 |
| 3,281,620 | 10/1966 | Bauer et al. | 29—588 X |
| 3,371,836 | 3/1968 | Forster et al. | 29—591 X |
| 3,414,969 | 10/1968 | Blum et al. | 29—590 X |

PAUL M. COHEN, Primary Examiner

U.S. Cl. X.R.

29—591, 627, 629, 630, 589; 317—234